United States Patent
Kopiec (10) Patent No.: US 9,278,616 B2
(45) Date of Patent: Mar. 8, 2016

(54) OPERATING FLUID CONTAINER

(71) Applicant: Kautex Textron GmbH & Co. KG, Bonn (DE)

(72) Inventor: Christian Kopiec, St. Augustin (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/350,879

(22) PCT Filed: Sep. 20, 2012

(86) PCT No.: PCT/EP2012/003919
§ 371 (c)(1),
(2) Date: Apr. 10, 2014

(87) PCT Pub. No.: WO2013/053423
PCT Pub. Date: Apr. 18, 2013

(65) Prior Publication Data
US 2014/0246440 A1   Sep. 4, 2014

(30) Foreign Application Priority Data
Oct. 10, 2011   (DE) .......................... 10 2011 115 384

(51) Int. Cl.
  *B60K 15/077*   (2006.01)
  *B60K 15/03*   (2006.01)
  *B60K 13/04*   (2006.01)

(52) U.S. Cl.
  CPC ........... *B60K 15/03177* (2013.01); *B60K 13/04* (2013.01); *B60K 15/03* (2013.01);
  (Continued)

(58) Field of Classification Search
  USPC ................. 137/573, 574, 576; 220/4.12, 4.13, 220/4.14, 563, 564, 734, 555, 553, 905, 562
  See application file for complete search history.

(56) References Cited

U.S. PATENT DOCUMENTS

| 2,792,164 | A | * | 5/1957 | Cauffiel ..................... 182/194 |
| 4,453,564 | A |   | 6/1984 | Bergesio |

(Continued)

FOREIGN PATENT DOCUMENTS

| DE | 19650415 A1 | 6/1998 |
| DE | 19909041 A1 | 9/2000 |

(Continued)

OTHER PUBLICATIONS

PCT International Search Report and Written Opinion mailed Jun. 19, 2013, received in corresponding PCT Application No. PCT/EP12/03919, 12 pgs.

(Continued)

*Primary Examiner* — Mickey Yu
*Assistant Examiner* — Allan Stevens
(74) *Attorney, Agent, or Firm* — Grossman Tucker Perreault & Pfleger, PLLC (57) ABSTRACT

The invention relates to an operating fluid container for a motor vehicle, said container including a container body which is assembled from at least two injection-molded shells of thermoplastic plastics material which are complementary to each other. The shells are provided in each case with integrally molded structures which extend into the free container volume in such a manner that they bring about a restriction of a fluid surge created, for instance, in the container. At least some of the structures on each of the two shells are welded together at least in part or in a punctiform manner approximately in the joining plane of the container.

18 Claims, 4 Drawing Sheets

(52) U.S. Cl.
CPC .... *B60K 15/077* (2013.01); *B60K 2015/03032* (2013.01); *B60K 2015/0344* (2013.01); *B60K 2015/0346* (2013.01); *B60K 2015/0775* (2013.01)

(56) References Cited

U.S. PATENT DOCUMENTS

| | | | | |
|---|---|---|---|---|
| 4,456,564 | A * | 6/1984 | Stapp | 562/33 |
| 4,974,743 | A | 12/1990 | Sasaki et al. | |
| 5,398,839 | A | 3/1995 | Kleyn | |
| 6,138,859 | A | 10/2000 | Aulph et al. | |
| 6,637,628 | B2 * | 10/2003 | Hoser | 222/484 |
| 2002/0100759 | A1 | 8/2002 | Schmidt et al. | |
| 2006/0011173 | A1 | 1/2006 | Davis et al. | |
| 2006/0151505 | A1 | 7/2006 | Kobayashi | |
| 2011/0233225 | A1 * | 9/2011 | Goto | 220/746 |
| 2012/0223084 | A1 | 9/2012 | Criel et al. | |

FOREIGN PATENT DOCUMENTS

| | | | |
|---|---|---|---|
| EP | 64310 | A2 * | 11/1982 |
| EP | 0775606 | A2 | 5/1997 |
| JP | S62108127 | U1 | 7/1987 |
| JP | H03077713 | U1 | 8/1991 |
| SU | 379477 | A1 | 4/1973 |

OTHER PUBLICATIONS

English translation of Japanese Office Action dated Jun. 10, 2015, received in corresponding Chinese Application No. 2014-534988, 8 pgs (includes English language description of cited references on pages 5-8).

English translation of Russian Decision to Grant, received in corresponding Russian Application No. 2014117638, 4 pgs.

* cited by examiner

OPERATING FLUID CONTAINER

CROSS-REFERENCE TO RELATED APPLICATIONS

This application is a national phase 371 application of PCT application no. PCT/EP2012/003919 filed Sep. 20, 2012, which claims priority to German application no. 10 2011 115 384.9 filed Oct. 10, 2011 which are hereby incorporated by reference.

FIELD

The invention relates to an operating fluid container for a motor vehicle.

SUMMARY

The term operating fluid container within the meaning of the present application can refer either to a so-called secondary fluid container or to a fuel container. Those operating fluid containers which accommodate operating fluids that are not necessary for the direct operation of an internal combustion engine are referred to as secondary fluid containers. In this connection, suitable operating fluid containers, for example, are windscreen wash containers, oil containers, secondary oil containers, coolant fluid containers for air-conditioning systems or so-called SCR containers. SCR containers are containers which accommodate a urea solution for catalytic exhaust gas reduction. Such containers play an increasing role in the course of emission control in the case of diesel vehicles. As the urea solution develops unpleasant odours in particular in contact with atmospheric oxygen, the so-called servicing capability of the container also plays an increasing role, in particular in the case of containers in passenger cars, the servicing and the refilling of the containers should be carried out where possible by service personnel at the workshop. Accordingly, the container volumes are designed in accordance with the inspection interval usual nowadays. As the container volumes increase, the development of the container has to be designed according to stability criteria and with regard to sloshing and surging noises created for instance as a result of movements of the fluid induced by the dynamics of the vehicle movement.

The operating fluid container according to the present invention can obviously also be used as a fuel container with the fittings for the conveying of the fuel and with means for ventilation and aeration usually provided for this purpose.

The object underlying the invention is to provide for a motor vehicle an operating fluid container which is improved in particular with regard to the stability and the development of surge noises in the case of larger fluid volumes.

The object is achieved by an operating fluid container for a motor vehicle, said container including a container body which is assembled from at least two shells of thermoplastic plastics material which are complementary to each, wherein the shells in each case have integrally moulded structures which extend into the free container volume in such a manner that they bring about a restriction of a fluid surge created, for instance, in the container, wherein at least some of the structures on each of the two shells are welded together at least in part approximately in the joining plane of the container.

The operating fluid container according to the invention is preferably realized as an injection-moulded container of thermoplastic plastics material. In an advantageous manner, two half shells obtained by injection-moulding are welded together in an at least circumferential manner to form a closed container.

The advantage of producing the container using an injection-moulding method is that the shells can be provided in each case relatively simply with integrally moulded structures. As an alternative to this, it is also possible for the container according to the invention to be assembled from deep-drawn half shells of thermoplastic plastics material.

It is provided according to the invention, in addition to the circumferential edge-side welding of the half shells, to reinforce the same at least in a punctiform manner by way of structures which extend right into the free container volume, by way of which structures then, on the one hand, a division of the free container volume into compartments which are separated more or less from each other is achieved and, on the other hand, the stability of the container is significantly increased. The welding together of the structures which extend right into the container bestows a higher level of compressive strength on the container overall, in particular a higher carrying capacity in the direction of gravity as a result of greater amounts of fluid contained in the container.

In the case of an expedient embodiment of the operating fluid container according to the invention, it is provided that in each case one integrally moulded surge wall element is provided on at least two shells, wherein the surge wall elements of two complementary shells are welded together in the joining plane at least in a punctiform manner. The term joining plane within the meaning of the present invention does not necessarily refer to a single two-dimensional plane, rather the joining plane can be offset or the shells can have several joining planes which can also extend diagonally, where applicable, with reference to the position of installation.

In this way, a reduction of sloshing movements of the fluid straying in the container can be achieved in an effective manner without this being implemented with an increase in weight caused by additional fittings in the container. In addition, this also leads, as already mentioned above, to a significant increase in stability.

In order to enable rapid levelling inside different regions of the container and to enable rapid fluid removal from the container without significant flow resistance, it is advantageous when the surge wall elements are provided at least in part with openings.

The surge wall elements do not necessarily have to merge into the relevant container wall in a linear manner, rather said surge wall elements can be provided in the regions abutting against the container wall with openings which form bridges. As an alternative to this, the surge wall elements can be connected to the container wall by means of individual webs such that said surge wall elements have a certain reversible deformability at the fluid impact.

In the case of a preferred variant of the operating fluid container according to the invention, it is provided that two surge wall elements of complementary shells, said surge wall elements adjoining each other, form flow passages between each other. At least one of the surge wall elements can be provided additionally, as mentioned above, with openings.

In the case of a particularly preferred embodiment of the operating fluid container according to the invention, it is provided that the surge wall elements of different shells intersect in their projection onto the joining plane and abut against each other only in the region of their intersecting points.

In this way, flow passages are produced between the regions of the container which are formed by the surge wall elements and which extend transversely with respect to a wave propagation anticipated in the fluid, that is to say approximately vertically in the position of installation of the container.

It is particularly advantageous when the surge wall elements of different shells are welded together in the joining plane in the region of their intersecting points.

In addition to this or as an alternative, the shells can have in each case at least one dome which extends into the container volume, the shells being supported in relation to each other by means of the domes. Said domes can be welded to each other for example at the end face and in each case can form pillars for surge fittings extending between the domes.

In the case of an expedient development of the operating fluid container according to the invention, it is provided that the shells are centred with respect to each other by means of at least two domes.

The domes, in this case, ensure a defined spacing between the large-area container wall regions with respect to each other, stabilize the container in the case of possible pressure fluctuations in the container and serve as fastening/anchoring points for surge fittings which are to be provided in the container and which can be integrally moulded or, however, can have been fastened on the domes prior to joining the half shells together. Over and above this, said domes fulfil the function of centering the shells with respect to each other during the joining operation, that is to say when welding the shells.

The domes can be realized, for example, in each case as inversions of the container wall. Stabilization of the container by means of supports/pillars/domes can be achieved in this way using the smallest possible amount of material. The domes do not necessarily have to be peg-shaped, rather they can have other geometries. Neither do they have to necessarily be realized as inversions of the container, rather support crosses or angular support pillars which are injected onto the container inner wall can also be provided in place of domes.

In the case of a particularly advantageous embodiment of the operating fluid container according to the invention, it is provided that at least one cable and/or line duct is provided in at least one surge wall profile. To this end, for instance keyhole-shaped openings can be provided, for example, in the surge wall profiles, through which, during the assembly of the shells, cables and/or lines can be clamped or pressed into position. The relevant opening in the surge wall profile is closed when adding the complementary shells to the container such that a defined position of the lines and/or cables is ensured inside the container volume.

The container wall can be provided with reinforcement structures such as ribs, honeycombs or the like at least in sections.

Over and above this, however, the container walls can also be clad with elastic mats. Such an arrangement serves for absorbing the transmission of structure-borne noise. These types of mats can be arranged, for example, by bonding, that is to say by interposing an adhesive on the container inner wall. Mat-like structures can be injected onto the inner wall of the container as an alternative.

In the case of a very advantageous variant of the operating fluid container, at least one flexible mat, which is preferably wavable and can float as a result of the fluid dynamics, that is to say can follow a wave movement of the fluid at least in a restricted manner, extends inside the container volume.

Such a flexible mat can extend approximately parallel to the joining plane of the container. For example, a surge mat can be clamped between several domes in such a manner and can be penetrated by said domes in such a manner that it can be lifted in relation to the domes as a result of the fluid dynamics.

In the case of an expedient development of the operating fluid container according to the invention, it is provided that that the shells are welded together by means of a circumferential flange, wherein the flange is realized as an undercut collecting edge, which makes it possible, for example, to mount heat shields, insulating elements or the like.

To reduce the propagation of structure-borne noise caused by surge noises generated by the fluid in the container, the container can be provided, for example at the edge, with fastening eyelets/fastening eyes, into which elastic bushes are inserted. The elastic bushes can be integrally injection-moulded, for example. As an alternative to this, the eyelets/eyes can be injected around by an elastic material, for example a thermoplastic elastomer.

FIGURES

The invention is explained below by way of an exemplary embodiment shown in the drawings, in which:

FIG. 4 shows a view along the lines IV-IV in FIG. 3B, FIGS. 5 and 6 show sectional views of the circumferential container edge.

DETAILED DESCRIPTION

The operating fluid container 1 according to the invention is provided essentially as a container for the accommodation of a fluid urea solution for the catalytic reduction of exhaust gases in diesel vehicles. As already mentioned above, the operating fluid container according to the invention could also certainly be realized as a fuel container.

Said operating fluid container consists essentially of thermoplastic plastics material, comprising two shells 2a, 2b which have been produced in each case by means of injection-moulding and have been welded together along a circumferential flange 3 to form a closed container.

The operating fluid container 1 includes, for example, a filler neck 4 for tapping lines as well as a connection nipple 5 for operating and refuelling venting.

The bottom shell 2b of the operating fluid container 1 is provided with a bottom opening 6 for the insertion of a conveying module (not shown) with further operating components.

Figure 3A:
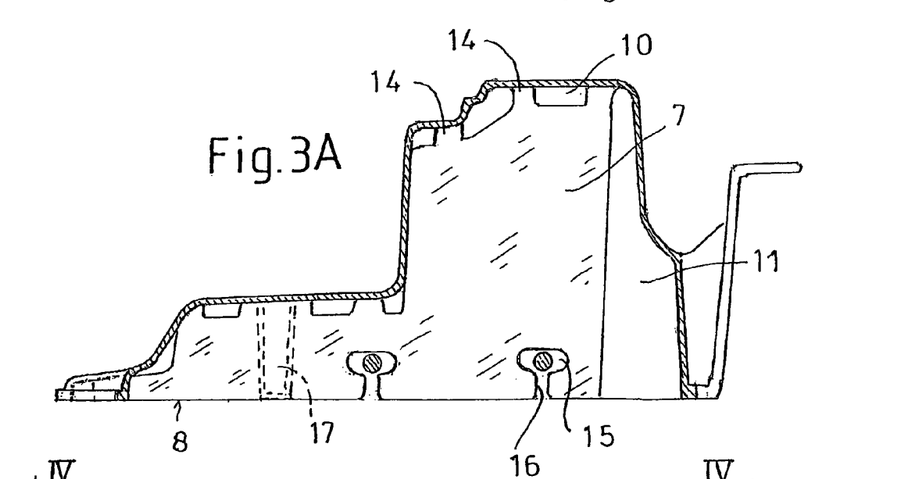
FIG. 3A shows a cross section through the top shell of the container according to the invention.
Figure 3B:
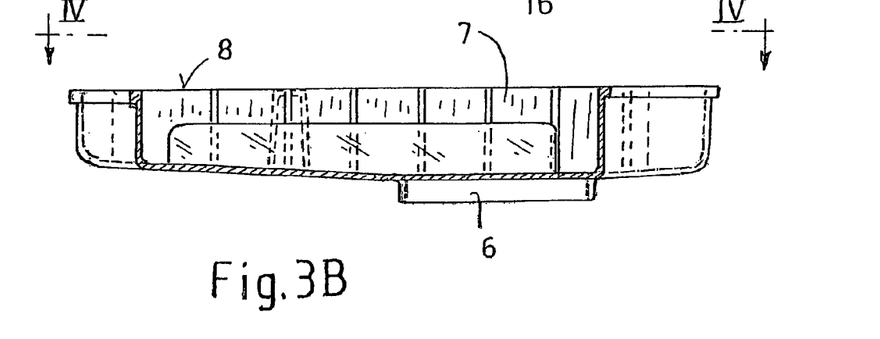
FIG. 3B shows a cross section through the bottom shell of the container according to the invention.
Figures 4, 5, 6:
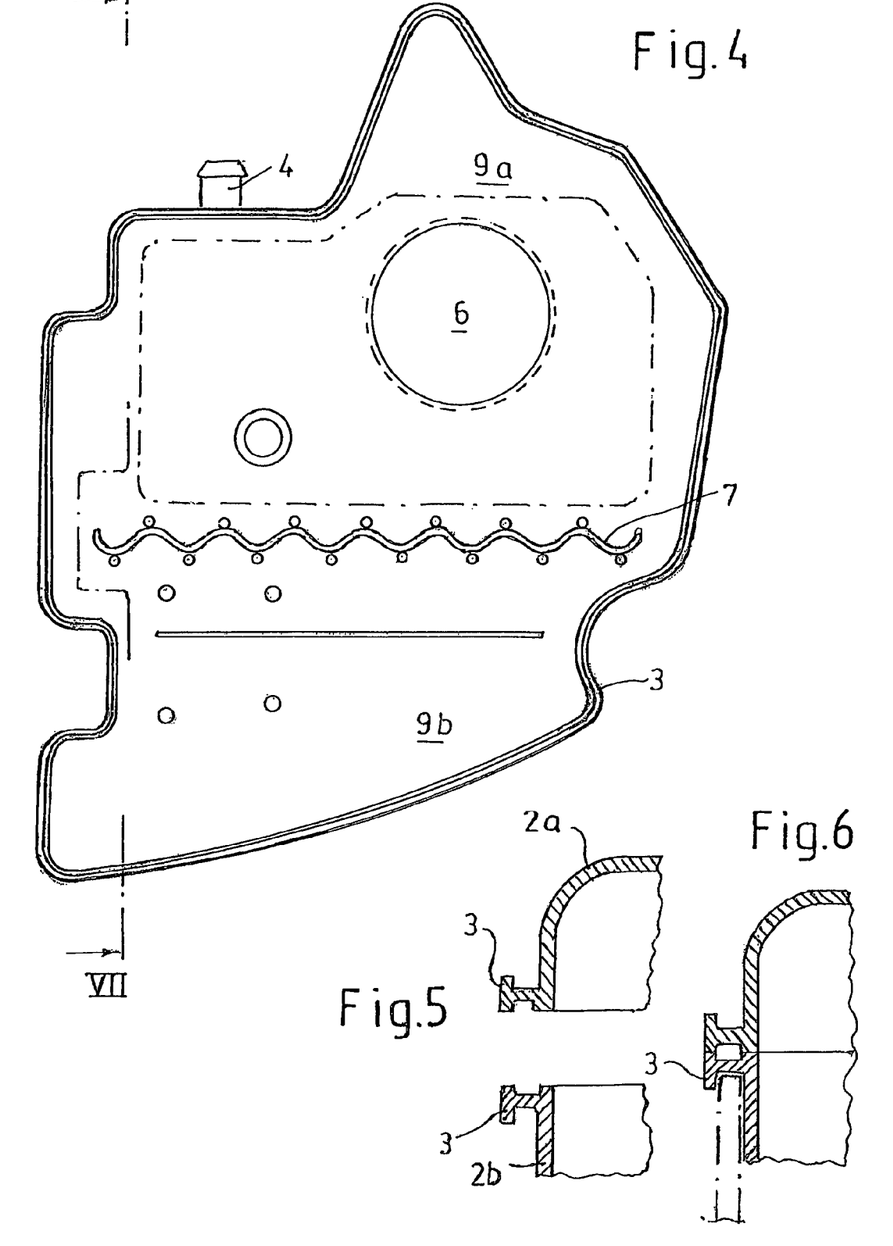

As can be seen in particular when looking at FIGS. 3 and 4 together, at least one surge wall element 7 is integrally moulded on each of the shells 2a, 2b. The surge wall element provided in the bottom shell 2b is realized, for example, extending in the shape of a wavy line, whereas the surge wall element 7 in the top shell 2a extends in an approximately straight line into the volume of the operating fluid container 1. The surge wall elements can obviously form different geometries, e.g. can be arranged extending in a zigzag or curved manner. The surge wall elements 7 are both realized so as to close off approximately flush with the joining plane 8 which is clamped by the circumferential flange 3. In the case of the exemplary embodiment shown, the joining plane 8 extends between the shells 2a, 2b in an approximately horizontal and level manner. Obviously, said joining plane 8 can be offset with reference to a horizontal installation position.

With the shells 2a, 2b assembled, the surge wall elements 7 of both shells 2a, 2b abut against each other in the joining plane 8 such that they form two compartments 9a, 9b inside the operating fuel container 1. A fluid exchange between the compartments can be effected, on the one hand, through openings 10 in the surge wall elements 7, on the other hand, the surge wall elements 7 do not extend completely between two diametrically opposite points of the flange 3 such that lateral ducts 11, which also enable a fluid exchange between the compartments 9a, 9b, are created.

Figures 8, 9:
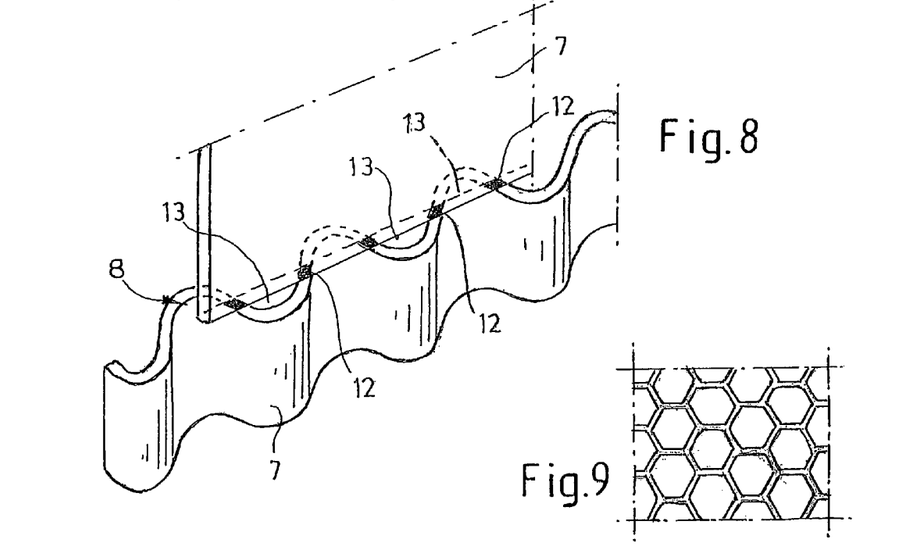
FIG. 8 shows a perspective view of the detail of detail VIII in FIG. 7.
FIG. 9 shows a view of the detail of the container wall (position IX in FIG. 7)

Over and above this, the surge wall elements 7 of two shells 2a, 2b, as can be seen in particular in FIG. 8, are arranged in the joining plane 8 so as to abut against each other only in a punctiform manner such that window-like openings 13, which extend in the joining plane 8, are created between the weld points provided there, said openings enabling fluid exchange and passage transversely with respect to the joining direction of the shells 2a, 2b, that is to say in the installation position approximately vertically and transversely with respect to the surge movement of the fluid.

Reference is once again made to FIG. 3, in which the surge wall element 7 provided in the top shell 2a can be seen. Said surge wall element 7 is injection-moulded onto the shell 2a by means of material bridges 14. On the one hand, the openings 10 created thereby enable fluid exchange, on the other hand as a result the surge wall element 7, with reference to the shell 2a, obtains a certain flexibility which is desirable for reasons of the propagation of structure-borne noise as well as for reasons of the stability of the operating fluid container 1.

As can also be seen from FIG. 3, the surge wall element 7 provided in the top shell 2a is provided with keyhole-shaped receiving means 15 for lines and/or cables. A cable or a line can be pressed into the receiving means 15 through the insertion slot 16 prior to fitting the shells 2a, 2b together, as is shown by implication. When the shells 2a, 2b are joined together, the relevant line is held in a captive manner in the receiving means 15 and is securely fixed in position for the service life of the operating fluid container 1.

Reference is now made to FIGS. 5 and 6, in which an enlarged and sectioned representation of the flange 3 of the shells 2a, 2b is shown.

As can be seen from the drawing, the flange 3 of the shells 2a, 2b is realized as an undercut collecting edge, in which region the shells 2a, 2b are welded in a circumferential manner. Said undercut collecting edge enables the flange 3 to be encompassed by means of retaining brackets or the like. In this way, for example, the bottom shell 2b can be underpinned by means of a heat shield (not shown).

As an alternative or in addition to this, it can be provided that the shells 2a, 2b are encompassed on the flange 3 by means of tightening straps. The flange 3 can also serve for the purpose of providing outer insulation on the operating fluid container 1.

In addition to the surge wall elements 7 described beforehand, other structures can be provided in the free volume of the operating fluid container 1 for preventing sloshing and surging noises.

For example, a honeycomb structure (not shown) can be arranged in the operating fluid container 1.

As an alternative to this, it can be provided that free volumes of the operating fluid container are filled out with an open-pored foam body or another sponge-like structure.

Additional stabilizing of the operating fluid container 1 is achieved by column-shaped domes 17 which have been obtained in each case by inversions of the shells 2a, 2b.

Figure 7:
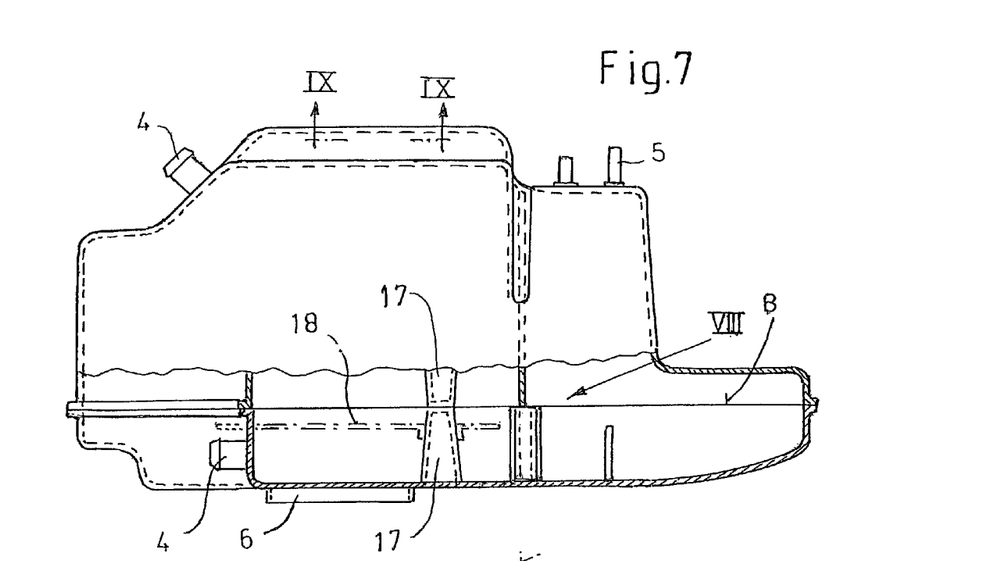
FIG. 7 shows a further part sectional view of the container according to the invention.

As can be seen in particular from FIG. 7, the domes 17 are arranged in the shells 2a, 2b such that they abut against each other when the shells 2a, 2b are joined together. This can be effected in an obtuse manner at the end face, the domes then being welded together in the region. As an alternative to this, it is possible to realize the domes 17 in each case with profiled end faces which interlock, for example, according to the press-stud principle and centre the shells 2a, 2b in relation to each other in order to bring about both an alignment and a supporting of the shells 2a, 2b or of their larger wall regions in relation to each other.

In the case of the exemplary embodiment shown, only one dome 17 is provided in each of the shells 2a, 2b such that there is only one strut/support/column in the operating fluid container.

It is obviously possible for several domes 17, which serve, for example, for the securing of a flexible surge mat 18, to be provided in each case in the shells 2a, 2b. Said surge mat 18 is shown only by implication in FIG. 7. The surge mat 18 can be provided, for example, with several openings which are approximately annulus-shaped and serve as fastening eyes. Said openings can be penetrated by several domes 17 which then together serve as fastening columns for the surge mat 18 in such a manner that the surge mat 18 can be lifted by the wave movement of the fluid.

The surge mat 18 can be realized both as a closed mat and as a grid/network or sieve structure.

The operating fluid container 1 according to the invention is provided in an advantageous manner in sections with reinforcements of the container wall thereof. For example, the inner surface of the container wall can be realized as a honeycomb. Such a honeycomb is shown, for example, in FIG. 9.

Figure 10:
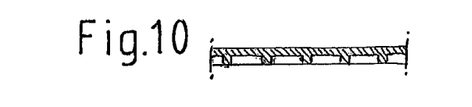
FIG. 10 shows a further view of the detail of the container wall according to position X in FIG. 7.

As an alternative to this or in addition, the inner wall of the container can be provided with ribs for reinforcement, as is shown, for example, by implication in FIG. 10.

Figure 1:
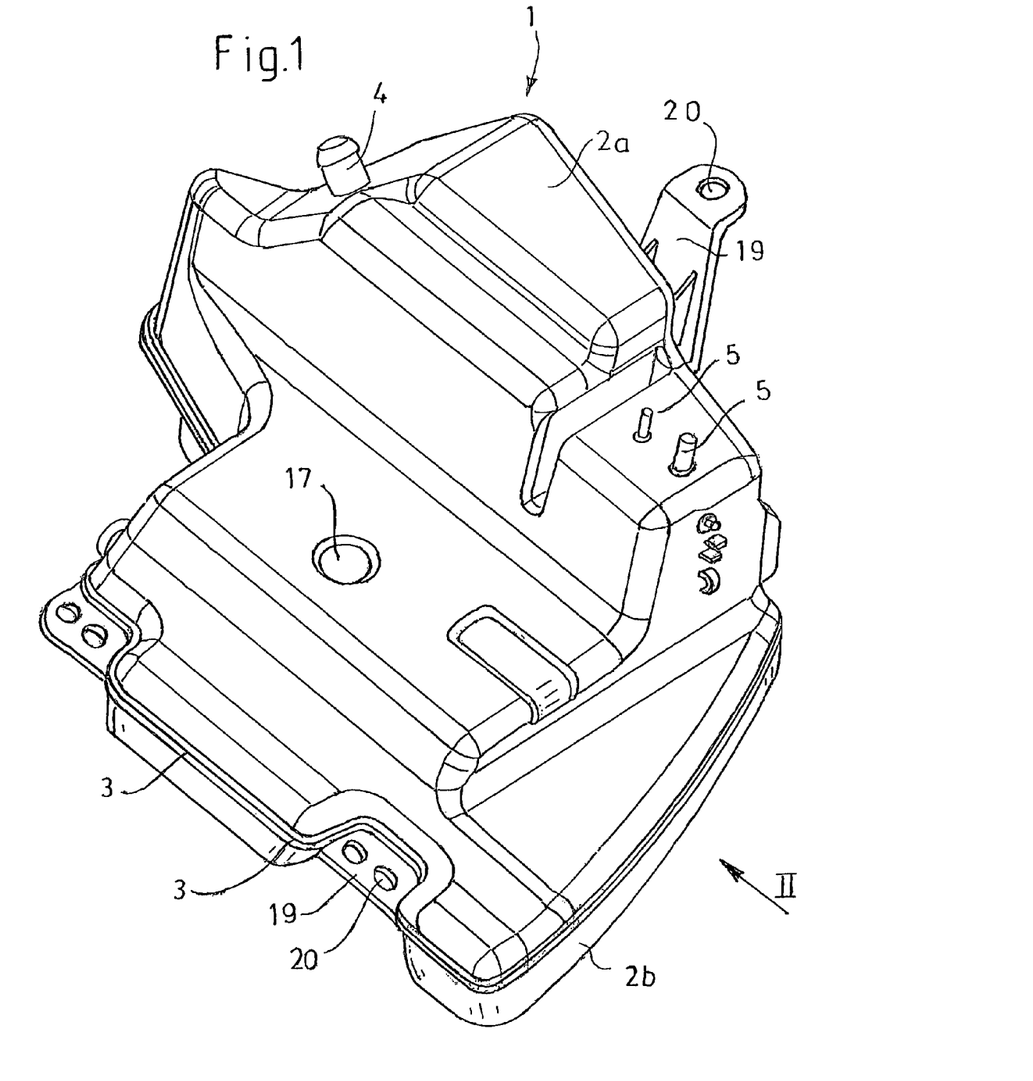
FIG. 1 shows a perspective view of a container according to the invention.
Figure 2:
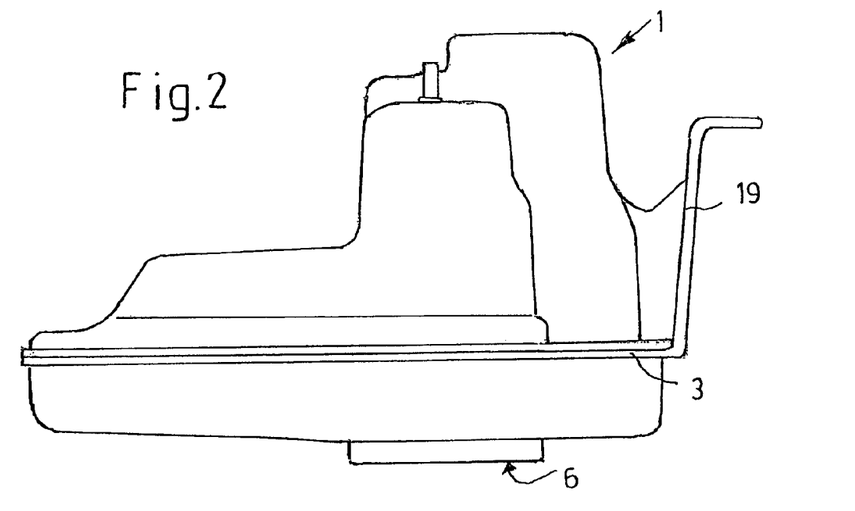
FIG. 2 shows a side view of the container according to the invention.

As can be seen from FIG. 1, both in the top shell 2a and in the bottom shell 2b the operating fluid container 1 includes fastening tabs 19 with fastening bores 20, which serve for connection to the bodywork. Elastomer bushes can be inserted into the fastening bores 20 for decoupling the operating fluid container 1 with reference to the bodywork. Such fastening bores 20 can also be injection-moulded.

LIST OF REFERENCES

1 Operating fluid container
2a, 2b Shells
3 Flange
4 Filler neck
5 Connection nipple
6 Bottom opening
7 Surge wall element
8 Joining plane
9a, 9b Compartments
10 Openings 11 Lateral ducts
12 Weld points
13 Openings
14 Material bridges
15 Receiving means
16 Insertion slot
17 Dome
18 Surge mat
19 Fastening tabs
20 Fastening bores

What is claimed is:

1. An operating fluid container for a motor vehicle, said container comprising:
    a container body which is assembled from at least two shells of plastics material which are complementary to each other;
    wherein the at least two shells each have an integrally moulded surge wall element which extends into a free container volume of the container body in such a manner that, when a fluid is located in the container, the integrally moulded surge wall elements bring about a restriction of a fluid surge of the fluid when created in the container;
    wherein at least a portion of the integrally moulded surge wall element on each of the at least two shells is welded to each other at least in part approximately in a joining plane of the at least two shells;
    wherein the integrally moulded surge wall elements are welded to each other approximately in the joining plane of the at least two shells in a punctiform manner forming a plurality of weld points;
    wherein at least one fluid flow passage is formed between the plurality of weld points of the integrally moulded surge wall elements, wherein the at least one fluid flow passage extends through at least one fluid flow opening which extends in the joining plane of the at least two shells; and
    wherein the integrally moulded surge wall elements close off approximately flush with the joining plane such that fluid in the container is capable of flowing through the at least one fluid flow opening perpendicularly to the joining plane.

2. The operating fluid container according to claim 1, wherein:
    at least one surge wall element is provided with openings.

3. The operating fluid container according to claim 1, wherein:
    the surge wall elements of different shells intersect in their projection onto the joining plane and abut against each other only in a region of their intersecting points.

4. The operating fluid container according to claim 3, wherein:
    the surge wall elements of different shells are welded together in the joining plane in the region of their intersecting points.

5. The operating fluid container according to claim 1, wherein:
    each shell has at least one dome which extends into the free container volume and the shells are supported in relation to each other by the domes.

6. The operating fluid container according to claim 5, wherein:
    the shells are centred with respect to each other by the domes.

7. The operating fluid container according to claim 5, wherein:
    each dome of the domes is realized in each case as inversions of a wall of the container body.

8. The operating fluid container according to claim 5, wherein:
    each dome of the domes is integrally moulded with a wall of the container body.

9. The operating fluid container according to claim 1, wherein:
    at least one of at least one cable duct and at least one line duct is provided in at least one surge wall element.

10. The operating fluid container according to claim 1, wherein:
    a container wall is provided with reinforcement structures such as ribs, honeycombs or the like at least in sections.

11. The operating fluid container according to claim 1, wherein:
    at least one flexible mat, which extends parallel to the joining plane of the container, is arranged inside the free container volume as a surge mat.

12. The operating fluid container according to claim 11, wherein:
    each shell has at least one dome which extends into the free container volume; and
    the surge mat is secured by the domes and is penetrated by the domes such that the surge mat is liftable in relation to the domes as a result of the fluid dynamics.

13. The operating fluid container according to claim 1, wherein:
    the shells are welded together by means of a circumferential flange, wherein the flange is realized as an undercut collecting edge.

14. The operating fluid container according to claim 1, wherein:
    the at least one fluid flow opening which extends in the joining plane of the at least two shells comprises a plurality of fluid flow openings which extend in the joining plane of the at least two shells.

15. The operating fluid container according to claim 14, wherein:
    each fluid flow opening of the plurality of fluid flow openings which extend in the joining plane of the at least two shells is created between two of the weld points of the plurality of weld points.

16. The operating fluid container according to claim 1, wherein:
    the at least two shells comprise at least a first shell and a second shell joined in the joining plane;
    the integrally moulded surge wall element of the first shell is a straight wall;
    the integrally moulded surge wall element of the second shell is a curved wall; and
    the straight wall of the first shell and the curved wall of the second shell are welded to each other approximately in the joining plane of the first and second shells in the punctiform manner forming the plurality of weld points.

17. The operating fluid container according to claim 16, wherein:
    the at least one fluid flow opening which extends in the joining plane of the first and second shells comprises a plurality of fluid flow openings which extend in the joining plane of the first and second shells.

18. The operating fluid container according to claim 17, wherein:
    each fluid flow opening of the plurality of fluid flow openings which extend in the joining plane of the first and second shells is created between two of the weld points of the plurality of weld points.

* * * * *